United States Patent [19]

Cooper

[11] 4,316,801

[45] Feb. 23, 1982

[54] FILTER ASSEMBLY WITH JACKED FILTER CANNISTER

[75] Inventor: Roydon B. Cooper, Locust Valley, N.Y.

[73] Assignee: Pall Corporation, Glen Cove, N.Y.

[21] Appl. No.: 171,070

[22] Filed: Jul. 22, 1980

[51] Int. Cl.³ .............................................. B01D 27/10
[52] U.S. Cl. ...................................... 210/90; 210/133; 210/136; 210/232
[58] Field of Search ............... 210/130, 133, 136, 232, 210/234–236, 238, 437, 440, 441, 443, 444, 446, 448, 90

[56] References Cited

U.S. PATENT DOCUMENTS

| | | | |
|---|---|---|---|
| 2,932,400 | 4/1960 | Scavuzzo | 210/235 |
| 3,225,929 | 12/1965 | Sicard | 210/232 |
| 3,508,657 | 4/1970 | Cooper | 210/232 |

Primary Examiner—Ivars C. Cintins

[57] ABSTRACT

A filter assembly is provided having a filter bowl assembly attached to a filter head in a manner that allows jacking of a filter cannister into and away from sealing engagement with the head, comprising, in combination, a filter head; an inlet for unfiltered fluid and an outlet for filtered fluid in the head; and a filter bowl assembly comprising a filter cannister; a filter element removably disposed in the filter cannister across the line of fluid flow from the inlet to the outlet so that fluid flow from the inlet to the outlet normally proceeds through the filter; a jack ring removably attached to the head; and means attaching the filter cannister to the jack ring in a manner to jack the cannister onto the head into sealing engagement therewith when the jack ring is attached to the head, and off from the head when the jack ring is removed from the head, so that the cannister is jacked onto the head and off from the head by the jack ring for access to and replacement of the filter element in the cannister.

8 Claims, 3 Drawing Figures

FILTER ASSEMBLY WITH JACKED FILTER CANNISTER

In many filter assemblies with removable bowls used in industrial filtering operations in which the filter is subjected to high line pressures of the order from 500 up to about 2000 p.s.i. or more, the filter housing must be constructed in a manner such that the head portion is quite tightly and securely held to the bowl portion, and firmly bears against the filter element in order to prevent both external and internal leakage. Normally, compression seals or other gasket-type sealing members are provided between the tightly joined mating sections of the housing and between the housing sections and the filter element to assist in preventing leakage, and make it possible to break the seal on disassembly. This is because an O-ring seal is very difficult to break, especially after being subjected to high pressures for a long period of time.

Often, however, due to the tight engagement between the parts of the assembly and the expansion of the sealing members caused by the internal pressure of the system, it is extremely difficult to remove the head portion from the bowl portion to replace the filter element when it becomes clogged with contaminants. It is necessary with such assemblies to employ wrenches and hammers to break the tight seal between the filter housing head and the bowl portion of the filter assembly portion. Such a procedure is time-consuming and hard on the equipment. It can be extremely costly, if it is slow, since it is normally necessary to shut down the operation of the fluid system in which the filter is used while the filter cartridge is replaced. If several such filter assemblies are used in the fluid system, the delay due to the replacement of each filter cartridge can become a significant cost factor.

Another drawback of such conventional filter assemblies is that the abrasive contact between the housing parts and sealing members can generate contaminant particles which can enter the fluid system. Such contaminants eventually build up in the system and can cause abrasion and wear, and blockage of the components of the system.

One solution to the problem of removing the housing cover from the bowl of the filter assembly is to provide a self-securing and self-removing coupling mechanism as a portion of the housing assembly. Such coupling mechanisms are normally provided with a handle or a lever to facilitate the coupling and uncoupling of the cover to the bowl portion. Filter assemblies having such coupling members are shown in U.S. Pat. Nos. 3,317,053 to Dummler; 2,218,800 to Williams; 2,533,192 to Kennedy and 2,747,738 to Johnson et al. These patents disclose filter assemblies in which a rotatable coupling handle is provided on the head portion or cover of the housing. The handles are adapted to both tighten the head or cover on the bowl when rotated in one direction and pull the head from the bowl when rotated in the opposite direction.

In all of the filter assemblies shown, the coupling handle mechanism extends into the interior of the housing and in most instances a seal is provided between the head or cover and the rotatable handle to prevent leakage through or at the coupling handle mechanism. The difficulty with these filter assemblies having coupling mechanisms of the type described above and shown in the patents referred to above is that due to the fact that one of the members against which a seal to be formed is a rotatable member, wear of the seal is rapid and it is extremely difficult to provide a tight seal under the high fluid pressures that are required in many industrial fluid systems since leakage can occur at or through the coupling mechanism. Moreover, in the filter assemblies shown in these patents, the act of loosening and tightening the housing cover onto the bowl portion can cause wear of the sealing members and the housing and generate contaminant particles which enter the fluid system since the coupling mechanism extends in the interior of the housing.

U.S. Pat. No. 3,508,657, patented Apr. 28, 1970, to Cooper, overcomes these problems by providing a filter assembly adapted for use under extremely high pressures of the order up to 2000 p.s.i. or more with a coupling mechanism adapted to couple and remove the filter housing cover from the bowl portion in which the coupling mechanism is isolated from the fluid in the housing by an interior seal between the housing head and a support post in the bowl. Due to this construction, leakage from the assembly at or through the coupling mechanism cannot occur. Moreover, the operation of the coupling mechanism does not cause any significant wear of the sealing member since the coupling mechanism does not contact the sealing members and no rotational contact against the sealing members occurs.

This filter assembly comprises a housing having an inlet, an outlet, an open bowl, and a bowl cover; a filter element in the bowl across the line of flow between the inlet and the outlet, such that normally flow from the inlet to the outlet proceeds through the filter; a cover support assembly fixed in the bowl and having coupling means at one end; a coupling lever movably mounted on the cover and removably engaging the coupling means to fasten the cover to the support so that the support assembly and the cover in cooperation close off the open end of the bowl, said coupling lever and coupling means being operatively associated such that movement of the coupling lever in one direction draws the cover onto the bowl, and movement of the coupling lever in another direction separates the bowl and cover without rotation of the cover or bowl; and sealing means positioned between the support assembly and the head portion of the housing interiorly of the coupling means so as to form a seal between the cover and the bowl via the support post assembly, at the same time isolating the coupling means and coupling member from the fluid passing through the assembly from the inlet to the outlet. The sealing means is free from contact by any rotatable member and thus, is not subject to wear caused by such contact.

U.S. Pat. No. 4,172,798 to Kronbein, patented Oct. 30, 1979 provides a filter housing which is said to be simple, robust and compact in construction, versatile in use and capable of being opened or closed rapidly to change the replaceable filter element. The filter housing also has favorable flow characteristics and complies with safety requirements fully.

The filter housing has a first part and a tapering second part, an inlet and an outlet, and is arranged, in use, to contain a replaceable filter element, the first and second parts having complementary frusto-conical mating surfaces and being connected together by a screw threaded ring which is screwed onto the outer face of the first part and which includes an internal flange engaging an external flange on the second part. Leakage is prevented by a gasket.

As seen in FIG. 1, the top part 1 and the bottom part 2 are held together by the screw threaded ring 3 which is screwed onto the top part 1. The screw threaded ring 3 includes an internal flange 12 and this engages an external flange 13 on the bottom part 2. The frusto-conical seating 11 extends downwards towards and buttresses the flange 13. It is apparent from the figure that the ring is not so attached to the second part as to apply leverage thereto in separating the parts.

In accordance with the present invention, a filter assembly is provided having a filter bowl assembly attached to a filter head in a manner that allows jacking of a filter cannister into and away from sealing engagement with the head, comprising, in combination, a filter head; an inlet for unfiltered fluid and an outlet for filtered fluid in the head; and a filter bowl assembly comprising a filter cannister; a filter element removably disposed in the filter cannister across the line of fluid flow from the inlet to the outlet so that fluid flow from the inlet to the outlet normally proceeds through the filter; a jack ring removably attached to the head; and means attaching the filter cannister to the jack ring in a manner to jack the cannister onto the head into sealing engagement therewith when the jack ring is attached to the head, and off from the head when the jack ring is removed from the head, so that the cannister is jacked onto the head and off from the head by the jack ring for access to and replacement of the filter element in the cannister.

In a preferred embodiment of the invention, the jack ring is threadably attached to the head and is in the form of a cylindrical or annular ring, threading onto a matching threaded portion of the filter head.

Other modes of attachment of the jack ring to the head can be employed. A translating bayonet-type joint on the jack ring, with projections, flanges, or pins on the head, is quite satisfactory, so as to draw the jack ring securely against the head, and with it the cannister, in the sealing engagement shown in the drawing.

In order to make it possible for the jack ring to jack the cannister both onto the head into sealing engagement therewith and off from the head, away from sealing engagement therewith, when the jack ring is attached or removed, respectively, the filter cannister must be held to the ring in a manner to permit rotation of the ring with respect to the cannister, and to prevent any substantial relative axial movement of the cannister and ring during this operation.

Since the cannister does not rotate with the jack ring, but moves only axially into and away from engagement with the head, there is no rotation with respect to the seal and therefore an O-ring seal can be used without any of the difficulties previously encountered.

One way of preventing relative axial movement of jack ring and cannister is to provide a flange on the cannister and retaining or lock rings in a recess or groove on the jack ring on either side of the flange. Another way is to shape the exterior of the cannister near the top in an expanded or reduced diameter where it engages the jack ring. This expanded or reduced portion of the exterior can be, for example, a flange, a groove, a ridge, or a flared or outwardly-extending top wall of the cannister. The inside wall of the jack ring can then be shaped to engage the expanded or reduced diameter portion on each side thereof, both above and below the portion.

If the expanded portion is an outwardly flared portion, the jack ring can be shaped to correspond with the cannister configuration at the flare, and then provided above the flared portion with a retaining ring that engages the top of the cannister.

The jack ring and cannister can be permanently rotatably attached together by a flange and mating groove construction therebetween.

Other variations will be apparent to those skilled in this art, but as should now be apparent, it is important that the jack ring rotatably engage the cannister, both from above and from below, so as to carry the cannister with it both up and down while the jack ring is being rotated during attachment to and withdrawal from the filter head.

The exterior of the jack can be shaped for rotation manually or by a tool, and can be polygonal, serrated, knurled, or provided with an abrasive safety grip.

A preferred embodiment of the invention is illustrated in the drawings in which.

The filter assembly shown in FIGS. 1 to 3 includes a filter head 1 to a dependent portion 2 of which is attached a filter cannister or bowl 3, within which is disposed a filter element 4, oriented as shown with the head on top and the bowl below.

Figure 2:
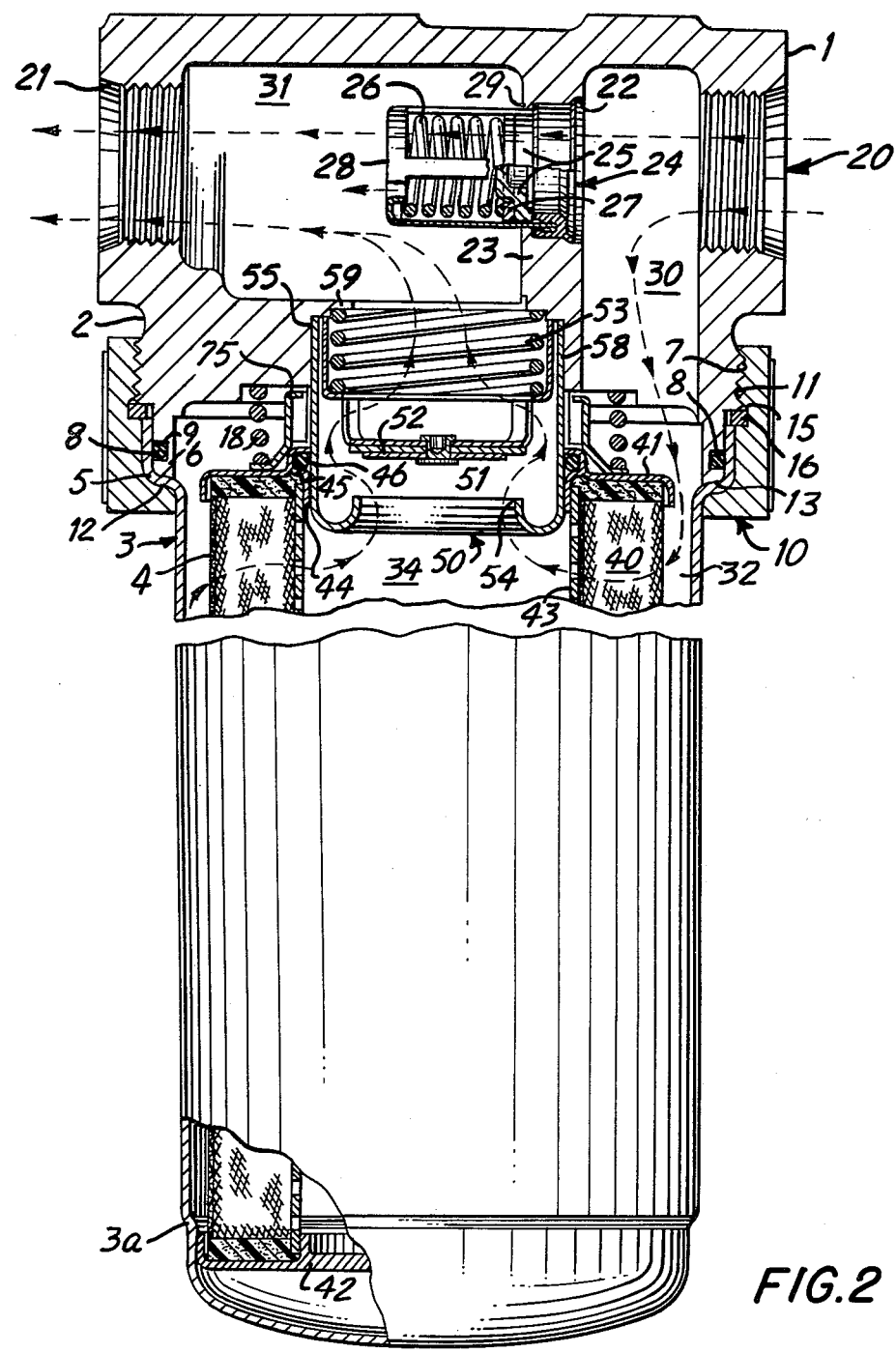
FIG. 2 is a longitudinal sectional view taken along the line 2—2 of the filter assembly of FIG. 1, and looking in the direction of the arrows.

As best seen in FIG. 2, the filter bowl is open at the top, and has a top side wall portion 5 flared outwardly, embracing the lower portion 6 of the filter head in sealing engagement with an O-ring seal 8 captured in a side groove 9 of the filter head, and retaining fluid in the filter bowl against leakage along the outside of the filter head portion 6.

The dependent filter head portion 2 has external threads 7 engaging with internal mating threads 11 on the jack ring 10, which is thus secured to the filter head. The lower portion of the jack ring 10 beneath the threaded portion has an inwardly extending arcuate ledge 12 conforming to the external configuration of the outwardly-flared top portion 5 of the bowl 3, and thereby retains the bowl against the head. The lower face 13 of the portion 6 of the filter head serves as a stop for the bowl 3 and makes it possible to securely engage the ring 10 against the head, and hold the bowl immovably against the head, sealed thereto by the O-ring 8.

The inner wall of the jack ring above the arcuate portion and below the threaded portion has inwardly facing groove 15 which receives and retains wire form ring 16, projecting inwardly from the recess sufficiently to engage the top face 18 of the filter bowl.

It will thus be seen that the jack ring 10 is rotatably mounted on the top portion of the bowl, and that when the jack ring 10 is screwed upwardly on the threads onto the head, it carries the bowl with it, until eventually the top inner wall of the bowl engages the stop 13 on the filter head, after which neither the bowl nor the jack ring can proceed further. On the other hand, when the jack ring 10 is unscrewed from the head, then the wire form ring 16 engaging the top face 18 of the filter bowl jacks the filter bowl downwardly with the ring, away from the filter head, and out from sealing engagement therewith. Thus, the jack ring jacks the filter bowl both upwardly into sealing engagement with the filter head, and downwardly away from sealing engagement with the filter head, the jacking being afforded by the threaded joint between the ring and head.

The filter head is provided with an inlet 20 for unfiltered fluid and an outlet 21 for filtered fluid. A port 22 through the internal wall 23 of the head carries a bypass valve 24 with a valve poppet 25 spring-biased by the compression spring 26 against the valve seat 27. The compression spring is confined within cage 28 which is anchored at the port end to the wall 23. The port 22 is wider at the inlet end, which opens into inlet passage 30, than at the outlet end, which opens into outlet chamber 31, with a ledge 29 that supports the valve cage 28.

At normal fluid pressure differentials between the inlet passage 30 and the outlet chamber 31, the spring biasing force is sufficient to retain the valve poppet 25 in its seat 27, and thus prevent bypass flow through the port. Whenever the fluid pressure differential exceeds a predetermined minimum, however, corresponding to that fluid pressure differential at which the filter element is blocked and/or sufficiently obstructed so as not to pass adequate filtered flow, then the biasing force of the spring is exceeded, and the poppet 25 is driven away from its valve seat by upstream fluid pressure, opening the port 22 to fluid flow which bypasses the filter element, thus ensuring flow downstream of the assembly in the event of serious filter blockage, even though this flow be unfiltered.

The inlet port 20 is in fluid flow connection with the inlet flow passage 30, and this leads directly into the filter bowl 3 and the space 32 between the outside of the filter 4 and the inside wall of the filter bowl 3, for reception of unfiltered fluid that is to pass through the filter.

At the bottom, the bowl 3 is constricted at 3a so as to engage the filter element end cap 42 and hold the element against movement in use.

The outlet port 21 is in fluid flow connection with the outlet chamber 31, and this chamber is in fluid flow connection with the internal open space 34 within the filter element, thus receiving filtered fluid from the filter element and conducting it to the outlet port.

Accordingly, normal flow of unfiltered fluid proceeds via the inlet port 20 into the inlet passage 30, and then to the space 32 outside the filter element 4. The fluid then flows through the pores of the filter element into the internal space or central passage 34 of the filter element, and thence into the outlet chamber 31, exiting from the filter assembly through the outlet port 21, while contaminants removed from the fluid are collected on the surface of the filter 4 within the space 32.

The filter element 4 is cylindrical, with a filter sheet 40, in this case corrugated sinter-bonded wire mesh formed into a tube and sealingly bonded to end caps 41, 42 at each end, and internally supported on a core 43.

The end cap 42 at the lower end of the filter element is closed, so that the only entry for fluid into the central passage of the filter cylinder is via the filter sheet 40, thus ensuring that all fluid in this space is filtered.

The upper end cap 41 is provided with a central opening 44, which fits over and in sealing engagement with the anti-drain back valve filter nipple 55 which serves as the housing for poppet assembly 50. The inside wall of the end cap 41 at the opening 44 is formed with a recess 45 capturing an O-ring 46, and this ring sealingly engages the outside wall of the filter nipple 55 of the anti-drainback valve assembly 50, thus preventing leakage flow bypassing the filter element, and compelling all filtered fluid to pass through the open center 51 of the valve assembly to the chamber 31.

This valve assembly 50 includes a valve poppet 52 spring-biased by the compression spring 53 towards the valve seat 54 at the lower end of the nipple or valve housing 55. The valve housing at its upper end is anchored in bore 58 in the dependent portion 2 of the filter head, and the spring 53 is seated against ledge 59 of the bore. When there is no fluid flow through filter 4 and thus to the assembly 50, there is no fluid pressure on the upstream face of the poppet 52, and in this condition the valve poppet seals against the seat 54. The valve then is closed against fluid flow in the reverse direction, from the chamber 31 towards the passage 34. This prevents back flow or drainback of tankage fluid in the event the filter assembly is below the tank. This permits servicing of the filter assembly without back flow.

The biasing force of the compression spring is rather low, however, and any small fluid pressure on the upstream side of the valve poppet, giving rise to a small forward fluid pressure differential, corresponding to the least normal forward fluid flow through the assembly, will drive the valve poppet 52 away from the seat, opening the valve through passage 51 to forward filtered fluid flow in the normal direction, and permitting filtered fluid from the inside central passage 34 of the filter element 4 to proceed to the outlet chamber 31 and then to the outlet 21.

Whenever forward flow stops, such as, for example, when the filter element 4 becomes blocked, the valve poppet will close. Moreover, any reverse fluid flow or back flow in the opposite direction, from downstream to upstream of the anti-drainback valve, will give rise to a reverse fluid pressure differential, whereupon the poppet 52 will close, and thus prevent back flow into the central passage 34 of the filter element. Such back flow must be prevented under most circumstances, since it could damage or unload the filter.

At any time that fluid pressure in chamber 31 (and passage 34) exceeds fluid pressure in space 32 (and passage 30), there can be back flow through the filter 4, that could damage the filter and/or lead to unloading of contaminants in the space 32, which can add to the normal contaminant load of the unfiltered fluid. For example, in the event of a reduction or even cessation of flow through the inlet, due to a break in the fluid line, or some other mishap, back flow through the filter element could unload the filter, with undesirable consequences. This the assembly 50 prevents, under all foreseeable circumstances.

In operation, normal unfiltered fluid flow through the inlet 20 would proceed through the inlet passage 30 into the space 32 outside the filter element and through the filter sheet 40 and core 43 into the internal passage 34. The filtered fluid in passage 34 proceeds through the anti-drainback valve assembly passage 51 into the outlet chamber 31, and then through the outlet.

Figure 3:
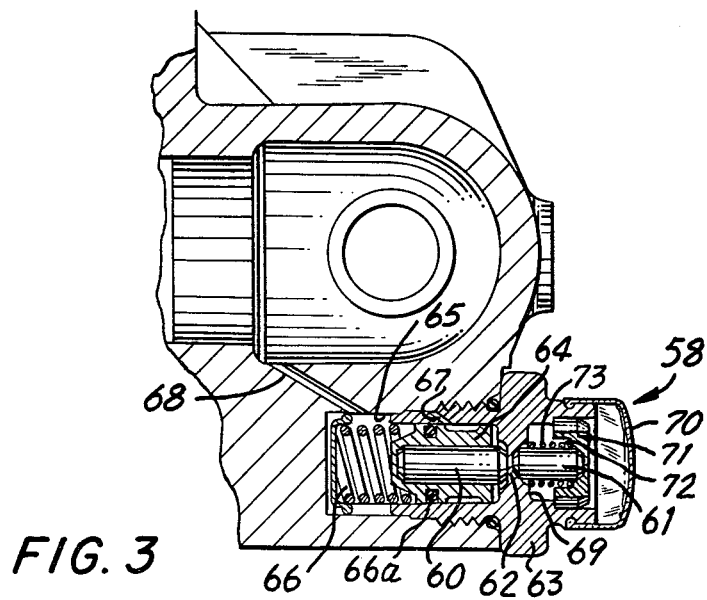
FIG. 3 is a partial longitudinal sectional view taken along the line 3—3 of the filter assembly of FIG. 1, looking in the direction of the arrows, and through the differential pressure indicator.

Under normal flow conditions, an indication of the satisfactory condition of the filter is afforded by the nonactuation of the differential pressure indicator 58, best seen in FIG. 3. The differential pressure indicator is of conventional type, as described and claimed in U.S. Pat. No. 2,942,572 to Pall, patented June 28, 1960.

The pressure indicator comprises two magnetic elements 60 and 61 coaxially mounted on opposite sides of a separating wall 62 within a housing 63. Preferably, both the elements 60 and 61 are composed of permanently magnetized Alnico V or the like and are positioned with opposite magnetic poles adjacent the wall 62 so that each is drawn toward the wall by the resulting force of attraction. If desired, however, only one of these elements need be a permanent magnet and the other may be formed of suitable magnetic material such as iron, for example.

Mounted in a tubular piston 64, the magnet 60 is slidably supported in a cylindrical bore 65 in the housing 63 and is urged toward the wall 62 by a coil spring 66. In order to prevent fluid from passing from one end of the bore 65 to the other, a liquid-tight seal is provided between the bore and the piston 64 by a ring 66a of "Teflon" or other suitable material. The coil spring 66 is selected according to the desired actuating pressure to permit the piston 64 to move downwardly in the bore 65 when the pressure at the upper end of the piston 64 exceeds that at the lower end by an amount equal to the actuating pressure.

A duct 67 leads from the inlet passage 30 to the end of the cylindrical bore 65 adjacent the wall 62, while the other end of the bore communicates with the outlet chamber 31 via passage 68.

On the other side of the wall 62, the magnetic element 61 is slidably received at one end in a bore 69 coaxial with the bore 65. Secured to the opposite end of the magnet 61 by a press fit, for example, a cap 70 includes a tubular wall 71 extending toward the housing 63 and radially spaced from the magnet. The annular recess 72 thus formed receives a coil spring 73 which extends from the cap 70 to the housing 63 to urge the cap and the magnet 61 away from the wall 62. The spring is selected so that it is retained in the stressed condition with the magnet 61 against the wall 62 by the attractive force of the two magnetic elements as long as the adjacent poles of the two magnets are separated by less than a predetermined distance, for example, one-sixteenth of an inch. Whenever the magnetic element 60 is moved away from the element 61 so that their adjacent poles are separated by more than a sixteenth of an inch, however, the decreased force of magnetic attraction resulting therefrom is overcome by the force of the spring 73 and the cap 70 and element 61 are driven away from the wall 62.

In operation, fluid pressure from the inlet passage 30 is communicated through the duct 67 to the top of the cylindrical bore 65, urging the magnet 60 and the piston 64 downwardly against the force of the spring 66 and fluid pressure from the outlet chamber 31. Whenever the difference between the inlet and outlet pressures is greater than the force of the spring 66, the piston 64 is driven downwardly in the bore 65. After the magnet 60 has moved to a position more than one-sixteenth of an inch away from the magnet 61, the attractive force between the two magnets is less than the force of the spring 73, and the magnetic element 61 is driven away from the wall 62. The cap 70, which, if desired, may be of a suitable eye-catching color such as red, rises to indicate that the pressure difference is greater than the predetermined value in accordance with which the spring 66 has been selected, which means that the filter element is blocked and needs to be serviced or changed.

Thus, whenever the fluid differential pressure between the inlet and outlet passages exceeds a predetermined minimum, corresponding to a degree of loading of the filter element that seriously obstructs or stops flow, the differential pressure indicator will be tripped, and give an indication of this condition.

At the same time, or at a slightly higher pressure differential between the inlet and outlet, the bypass valve 24 will open, and bypass flow will begin.

At either of these two stages, it is of course necessary to replace the filter element. This is done by shutting off flow, and then removing the filter bowl. Because of the ease of attachment of the bowl to the head, it is possible in one and a half minutes to remove the bowl and the element and replace the bowl with a fresh element, so that the down-time of the filter assembly during this servicing is at a minimum.

Bowl removal is accomplished by simply rotating the jack ring 10 from the head 2. This engages the wire form ring 16 against the top 18 of the bowl, and jacks the bowl downwardly, away from the head, breaking the seal between the bowl and the head at the O-ring 8, and making it easy to remove the bowl. The jack ring 10 is attached to the bowl, and so remains in place while the filter element is being replaced or serviced.

During removal of the bowl, the filter element is ejected from the head into the bowl by the spring 18 bearing on the ejector ring 75 attached to the nipple 55, which disengages the top end cap 41 and with it the filter element 4 from the nipple. The filter element can then be removed by lifting it out of the bowl, or by dumping the contents of the bowl.

Replacement of a fresh filter cylinder is accomplished by simply putting the element into the bowl 3, where it is positioned by the constricted portion 3a. The bowl 3 is then lifted until the threaded portion 7 of the jack ring 10 engages the threaded portion 11 of the head. At this point the filter element end cap 41 has been guided onto the nipple 55, but neither sealing ring 8 nor sealing ring 46 is engaged until the ring 10 is in threaded engagement with portion 11. The jack ring can then continue to be threaded onto the head, whereupon the jacking starts lifting the bowl and the element past the seals into sealing engagement. Eventually the flared top side 5 of the bowl is brought into engagement with the stop 13 of the head, after which the bowl can be tightly secured to the head by the ring, and fluid flow resumed.

Figure 1:
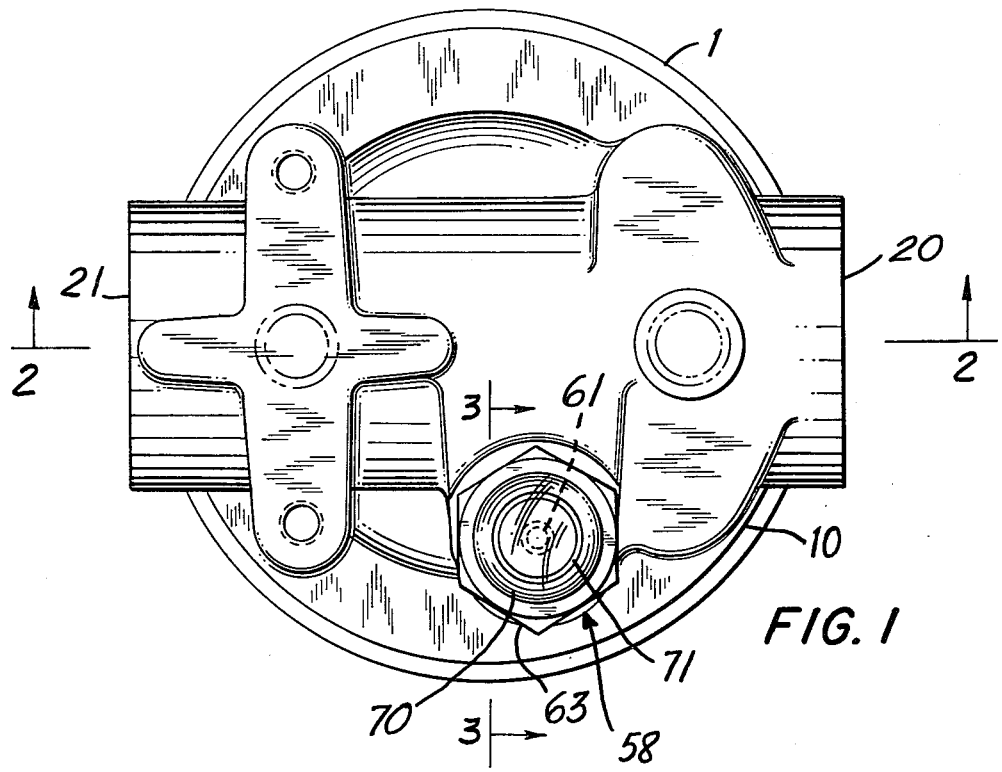
FIG. 1 is a top view of a filter assembly in accordance with the invention.

While the orientation of the filter assembly shown in FIGS. 1 to 3 is vertical, for convenience of handling, since this permits withdrawal of a bowl filled with fluid without spillage, it is of course possible to orient the filter assembly in any other desired plane, including horizontal. The removal and reattachment of the bowl to the head is exactly the same, whatever the orientation of the filter assembly.

The filter assembly shown in the drawings includes a differential pressure indicator, a bypass valve assembly, and an anti-drainback valve assembly. These are not essential, however, and any one or all of them can be omitted, if desired.

The drawings show an embodiment having a cylindrical filter element. The invention is also applicable to flat or curved sheet filter elements, such as a corrugated filter sheet. In this case, the filter chamber is in two parts, with the filter sheet a compartmenting divider wall separating the two parts. Fluid flow proceeds from the inlet port and inlet passage through the filter, and filtered fluid is collected on the other side of the filter, and led to the outlet chamber and port.

The filter assemblies of the invention are useful with any filter element having a filter sheet in tubular or cylindrical form, provided with end caps to close off the interior space enclosed by the filter sheet, and give control of the flow of filtrate. One or both of the end caps can be provided with flow passages for filtrate flow. The caps can be of any desired material, appropriate to the system and the need, and are bonded to the cylinder ends in a leak-proof seal by appropriate bonding agents. Such filter elements are conventional, and well known to those skilled in this art, and form no part of the instant invention. Melt-sealed end caps, as disclosed in U.S. Pat. No. 3,457,339, patented July 22, 1969, to David B. Pall et al, may be used.

The filter sheets can be formed of any porous sheet material having pores extending from surface to surface. One or several sheets of the same or varying porosity, and one or more of which may act as prefilters, can be employed, in close juxtaposition, or even bonded together, or also spaced apart. Sheets such as open-weave wire or plastic mesh may be added. Paper, which can, if desired, be resin-impregnated, is a preferred base material, since it yields an effective, versatile and inexpensive fluid-permeable filter medium. The invention is, however, applicable to sheet materials formed of any type of fiber, including not only cellulose fibers but also synthetic resin fibers and fibers of other cellulose derivatives including, for example, fibers of polyvinyl chloride, polyethylene, polypropylene, polyvinylidene chloride, cellulose acetate, cellulose acetate propionate, viscose rayon, polyacrylonitrile, polymers of terephthalic acid and ethylene glycol, polyamides, and protein fibers of various sorts, such as zein and the alginates, glass, asbestos, potassium titanate, mineral wood, polystyrene, rubber, casein, hemp, jute, linen, cotton, silk, wool, and mohair. Also useful, in addition to papers, are textile and wire fabrics, and woven and nonwoven fibrous layers of all kinds, such as felts, mats and bats made of fibrous materials of any of the types listed above, and woven wire mesh.

The sheet material should in most cases be sufficiently rigid to be self-supporting when folded in cylindrical form, but if it is not, a core and/or external sheath of rigid metal, plastic or similar rigid material can be provided, as a support.

Also, the filter sheet material of which the filter elements of the invention are made can be, if desired, impregnated with a synthetic resin or cellulose derivative to increase its strength and resistance to wear by the fluid being filtered. The impregnating agent can be any material useful in the impregnation of papers and textile materials. Such materials are well known in the paper and textile arts, and form no part of the instant invention. The impregnating agents can be in liquid form, capable of undergoing solidification as by polymerization, cross-linking, or the like. They can also be in solid form, and applied to the base from a solution in an inert solvent, or as melts. Representative impregnating resins include phenol-formaldehyde resins, urea-formaldehyde resins, melamine-formaldehyde resins, polyester resins, and polyepoxide resins.

The end caps capping the filter tube or cylinder can be of any desired material, such as metal or plastic. The end cap should be rigid, and attached to the tube or cylinder in a leak-tight seal. The end cap can be formed by molding or casting in the desired shape, integral or in one piece with the means movable along the weir, if this be part of the end cap.

The core and/or sheath support sections and end caps can be formed of any desired material sufficiently rigid to provide adequate support for the filter sheet with which it is to be used. Metal core supports are preferred, such as core supports of stainless steel or aluminum, which are readily stamped in any desired cross-sectional configuration, and which will retain that configuration and provide the desired rigidity. Stainless steel, which provides greater resistance to certain highly reactive fluids, is preferred. Steel, copper, magnesium, beryllium, titanium, nickel, iron and various alloys thereof are typical additional metals which can be used.

The core and/or sheath supports and end caps also can be formed of rigid synthetic polymeric materials and cellulose derivatives, such as, for example, glass, ceramics, phenol-formaldehyde resins, polytetrafluoroethylene, polychlorotrifluoroethylene, urea-formaldehyde resins, melamine-formaldehyde resins, polyvinyl chloride, polyvinylidene chloride, polystyrene, epoxy resins, polyoxymethylene, polypropylene, polyethylene, polyvinyl butyral, cellulose acetate, ethyl cellulose and cellulose acetate propionate. Cores made of such materials can be formed into core sections by molding from powders of the material, or by stamping or shaping of sheets of the material. This may be easier than molding the entire core support, in the case of complex cross-sectional configurations and when complex end connections for the core support are necessary. The plurality of sections composing such core supports of the invention can be bonded together by application of heat and pressure, or a suitable adhesive, or by application of a solvent for the material which will make possible fusion of the adjacent edges of the sections at the seams.

A suitable core is described in U.S. Pat. No. 3,246,766 to David B. Pall.

Having regard to the foregoing disclosure, the following is claimed as inventive and patentable embodiments thereof:

1. A filter assembly having a filter bowl assembly attached to a filter head in a manner that allows jacking of a filter cannister into and away from sealing engagement with the head, comprising, in combination, a filter head; an inlet for unfiltered fluid and an outlet for filtered fluid in the head; and a filter bowl assembly comprising a filter cannister; a filter element removably disposed in the filter cannister across the line of fluid flow from the inlet to the outlet so that fluid flow from the inlet to the outlet normally proceeds through the filter; a jack ring removably attached to the head; and means attaching the filter cannister to the jack ring in a manner to jack the cannister onto the head into sealing engagement therewith when the jack ring is attached to the head, and off from the head when the jack ring is removed from the head, so that the cannister is jacked onto the head and off from the head by the jack ring for access to and replacement of the filter element in the cannister.

2. A filter assembly according to claim 1 in which the jack ring is a cylindrical ring.

3. A filter assembly according to claim 2 in which the jack ring is threadably attached to the filter head.

4. A filter assembly according to claim 2 in which the cannister has an outwardly extending flared top side wall, and the jack ring has an inside wall shaped to conform to the flared top wall, so as to engage the cannister from one side and carries a retaining ring extending across the flared top of the cannister, so as to engage the cannister from the other side.

5. A filter assembly according to claim 1 including a differential pressure indicator sensing pressure differential between unfiltered fluid on the inlet side and filtered fluid on the outlet side of the filter element.

6. A filter assembly according to claim 1 including a bypass valve responsive to differential fluid pressure across the filter above a predetermined minimum, and a filter bypass passage controlled by the bypass valve and opened at such differential fluid pressure.

7. A filter assembly according to claim 1 including an anti-drainback valve downstream of and across the line of filtered fluid flow from the filter element to the outlet, responsive to any filtered flow back towards the filter element to close off such flow and inhibit unloading of the filter element.

8. A filter assembly according to claim 1 comprising bias means ejecting the filter element from the filter head when the jack ring is removed from the head.

* * * * *